(12) United States Patent
Akutsu

(10) Patent No.: US 7,439,990 B2
(45) Date of Patent: Oct. 21, 2008

(54) SURFACE SELECTING METHOD AND INFORMATION PROCESSING APPARATUS

(75) Inventor: Takashi Akutsu, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 486 days.

(21) Appl. No.: 11/204,343

(22) Filed: Aug. 16, 2005

(65) Prior Publication Data

US 2006/0044308 A1 Mar. 2, 2006

(30) Foreign Application Priority Data

Aug. 31, 2004 (JP) ............................. 2004-253101

(51) Int. Cl.
*G09G 5/00* (2006.01)
*G06T 17/00* (2006.01)
*G06T 15/40* (2006.01)

(52) U.S. Cl. ...................... 345/642; 345/420; 345/421

(58) Field of Classification Search ................ 345/420, 345/421, 642
See application file for complete search history.

(56) References Cited

U.S. PATENT DOCUMENTS

| | | | |
|---|---|---|---|
| 6,917,842 B2 | 7/2005 | Shimizu et al. | ............... 700/96 |
| 2002/0149625 A1 | 10/2002 | Shimizu et al. | ............. 345/771 |
| 2005/0210444 A1* | 9/2005 | Gibson et al. | ............... 717/108 |

FOREIGN PATENT DOCUMENTS

JP  2002-324086  11/2002

OTHER PUBLICATIONS

Planchard et al., "SolidWorks 2001 Tutorial", SDC publications, 2001, pp. 2-5-2-8.*
SolidWorks, "SolidWorks 2004: What's New", 2003, p. 6-12.*
SolidWorks, "SolidWorks 2005 delivers new features to make design engineers faster, more accurate, and more productive", Jun. 9, 2004, https://www.solidworks.org/pages/popups/viewrelease.html?prfile=06_09_2004_SW2005.html.*

* cited by examiner

*Primary Examiner*—Ulka Chauhan
*Assistant Examiner*—Jeffrey J Chow
(74) *Attorney, Agent, or Firm*—Fitzpatrick, Cella, Harper & Scinto

(57) ABSTRACT

A surface selecting method in an information processing apparatus for selecting a prescribed surface of a 3D model displayed on a display unit of the information processing apparatus includes a display control step of controlling the display unit so as to display the 3D model, and a detection step of detecting an indication to an edge line formed by two adjoining surfaces of the 3D model displayed on the display unit. In addition, a determination step determines whether the indication is an indication to an edge line formed between a first surface and a second surface, wherein the first surface is not being displayed and the second surface is being displayed on the display unit, and a selection step selects the first surface, which is not being displayed on the display unit, if the indication is an indication to the edge line formed between the first and second surfaces.

5 Claims, 23 Drawing Sheets

SURFACE SELECTING METHOD AND INFORMATION PROCESSING APPARATUS

FIELD OF THE INVENTION

This invention relates to a surface selecting method and information processing apparatus for selecting a prescribed surface of a three-dimensional model displayed on a display unit of an information processing apparatus

BACKGROUND OF THE INVENTION

Articles (referred to simply as "components" below) having a three-dimensional shape, such as parts and units that construct commodities and products are designed conventionally using three-dimensional CAD (3D-CAD). When designing is performed using 3D-CAD, a 3D model of the component is fabricated and attribute information such as dimensions, dimensional tolerance, geometrical tolerance, remarks and symbols are input with respect to the 3D model. This attribute information is attached to the 3D model or to elements such as surfaces, edge lines or apices of the 3D model.

The 3D model and attribute information constitute information that is necessary for component machining, inspection, assembly or maintenance and must be conveyed in easily understandable fashion, efficiently and without mistakes from the operator (designer) who makes the input to the operator (machining, manufacture or inspection technician, etc.) who observes it.

With the objective of fabricating a component efficiently by appending attribute information to a 3D model efficiently with good operability and viewability and utilizing the appended attribute information efficiently to exploit the 3D model and attribute information in the fabrication of the component, the applicant has already proposed an information processing apparatus for setting virtual planes with which attribute information has been associated and storing attribute information in association with the virtual planes (see Prior Art 1: the specification of Japanese Patent Application Laid-Open No. 2002-324086).

With such 3D-CAD, there are many opportunities to select surfaces when creating a 3D model and inputting attribute information to the 3D model. More specifically, selection of surfaces is sought in various operations, such as when performing modeling in a direction parallel or orthogonal to the surface of a 3D model, when coloring a surface of a 3D model, when checking the distance or angle between one surface and another surface of a 3D model, and when inputting dimensions or remarks to the surface of a 3D model. A general method of selecting a surface is to display on a screen the surface that is desired to be selected and then click this surface using a pointing device such as a mouse.

An operation through which a distance dimension, which is attribute information, is input using the above-described surface selecting method will now be illustrated. FIG. 14 is a flowchart illustrating the processing of an operation for inputting a distance dimension according to the prior art. This represents an operation for inputting a distance dimension with regard to two surfaces A and B of a 3D model (see FIGS. 3 and 4). The state of the 3D-CAD display when input of a dimension has started is as illustrated in FIG. 3. The operation for inputting a distance dimension is performed in the following sequence: activate a command that is for inputting the distance dimension; select a first surface; select a second surface; specify the associated attribute layout plane; decide the dimension position; and deactivate the command that is for inputting the distance dimension.

More specifically, first a command for creating a distance dimension is activated from an attribute information creating menu (step S101) and a first surface A is selected. That is, it is determined whether the surface to be selected is being displayed (step S102). If it is not being displayed, then the attitude of the 3D model is changed to display the surface to be selected (step S104) and the surface to be selected is clicked (step S103). If the surface is being displayed, on the other hand, then the surface to be selected is clicked as is. Since surface A is being displayed in FIG. 3, this surface is selected by being clicked at step S103. When the surface A is selected, it is highlighted until completion of the dimension input in such a manner that the surface whose dimension is being input will be easy for the operator to discern (see FIG. 6).

Next, the second surface B is selected. The second surface B is selected in a manner similar to that of the first surface A. That is, it is determined whether the surface to be selected is being displayed (step S105). If it is not being displayed, then the attitude of the 3D model is changed to display the surface to be selected (step S107) and the surface to be selected is clicked (step S106). If the surface is being displayed, on the other hand, then the surface to be selected is clicked as is. Since the state of the display in this case is as shown in FIG. 6, surface B is not being displayed because it is hidden by other parts of the 3D model. This means that surface B cannot be selected by clicking it as is. Accordingly, the displayed attitude of the 3D model is changed at step S107 so as to display surface B. Surface B being displayed is then selected by being clicked at step S106. FIG. 15 is a diagram illustrating a state in which surface B is displayed. If surface B is selected, a dimension 2*a* is displayed (see FIG. 16). At this point in time, however, position has not been finalized and the position will change by following up movement of a mouse cursor 5. Further, surfaces A and B whose dimensions are being input are highlighted at this time. FIG. 16 is a diagram illustrating a state in which a dimension is displayed.

The operator thenceforth specifies an attribute layout plane 2 that correlates the dimension 2*a* (step S108). By specifying the attribute layout plane, it becomes possible for the distance dimension 2*a* to be placed in the attribute layout plane 2. By moving the cursor 5 under these conditions, the dimension 2*a* is moved in the attribute layout plane 2 (see FIG. 17). In comparison with the state that prevails at step S106, the dimension position moved is limited to the attribute layout plane 2. FIG. 17 is a diagram illustrating the state in which the position of the distance dimension is limited to the attribute layout plane 2. The position of the distance dimension 2*a* is decided by clicking a desired position in the attribute layout plane 2 (step S109; see FIG. 18). When this operation is completed, the highlighted surfaces A and B are restored to their usual state. FIG. 18 is a diagram illustrating a state in which the position of the distance dimension has been decided. Finally, the command for creating this distance dimension is terminated by clicking a dimension-input completion button (not shown) (step S110). A surface selection operation is performed and a dimension is input to the 3D model through this procedure.

Another general method of selecting a surface has also been put into practice. According to this method, any position on a display is clicked when a surface is to be selected. When the position is clicked, surfaces that overlap in the line-of-sight direction of the display with respect to the clicked position are highlighted one after another from the front side and a surface deciding operation is performed when the desired surface is in the highlighted state, whereby selection of the desired surface is achieved. An operation for inputting the distance dimension 2a (attribute information) between two surfaces A and B will be described with regard to a 3D model (see FIGS. 3 and 4) in a manner similar to that of the prior art set forth above.

FIG. 19 is a flowchart illustrating the processing of an operation for inputting a distance dimension according to another example of the prior art. The state of the 3D-CAD display when this dimension is input is that shown in FIG. 3, which is similar to the example of the prior art described above. The operation for inputting the distance dimension is performed in the following sequence: activate a command to input the distance dimension; select a first surface; select a second surface; specify the associated attribute layout plane; decide the dimension position; and deactivate the command to input the distance dimension.

Processing identical with that of the example of the prior art set forth above is identified by the same step numbers and need not be described again in detail. When the first surface A is to be selected, the surface A is being displayed (see FIG. 3) and therefore it is selected by being clicked. Further, when the surface A is selected, it is highlighted until the input of dimension is completed. This also is similar to the example of the prior art described above.

Next, when the second surface B is to be selected, the display is in the state shown in FIG. 6 and therefore the surface B is not being displayed because it is hidden by other parts of the 3D model. This means that surface B cannot be selected by clicking it. In this case, a surface search button (not shown) is clicked to thereby establish a surface selection mode (step S107A) and a position that is superimposed on the desired surface B is clicked (step S107B; see FIG. 20). Assume that the position of cursor 5 shown in FIG. 20 has been clicked. FIG. 20 is a diagram illustrating the state of the display in the surface selection mode. FIGS. 21A, 21B, 22A and 22B are diagrams showing the procedure of the surface selecting operation. By virtue of this operation, first a surface E, which is the frontmost surface among the surfaces that overlap the clicked position, is highlighted, as illustrated in FIG. 21A. An operation window 200 is displayed at the same time. FIG. 23 is a diagram illustrating the operation window 200.

If a "NEXT" button 201 in the operation window 200 is clicked, a surface F farther back than the surface E is highlighted (step S107C), as illustrated in FIG. 21B. If the "NEXT" button 201 is clicked again and again, a surface G (see FIG. 22A) and the surface B (see FIG. 22B) are highlighted one after the other in order from the front side. If there are no further surfaces in back (in this case, surface B is the surface farthest back), the surface highlighted returns to the frontmost surface (surface E in this case). If a "BACK" button 203 is clicked, surfaces will be highlighted in reverse order starting from the surface farthest back. The desired surface B is highlighted as a result of this operation. Surface B can be selected by clicking an "ACCEPT" button 202 in the operation window 200. This is followed by execution of the processing of steps S108 to S110 in a manner similar to that of the example of the prior art described above. Thus, a surface selection operation is performed and dimensions are input to the 3D model.

The case illustrated above is such that when two operations for inputting distance dimensions are performed, surface A, which is being displayed in the first surface selection, and surface B, which is not being displayed in the second surface selection, are selected. However, the order may be reversed as a matter of course. That is, surface B, which is not being displayed in the first surface selection, and surface A, which is being displayed in the second surface selection, may be selected. In this case, if the surface to be selected is not being displayed at step S102, it is so arranged that the surface to be selected is displayed using the operation window 200 in a manner similar to that of steps S107A to S107D (steps S104A to S104D). Further, if the surface to be selected is being displayed at step S105, then the processing of step S106 is executed in a manner similar to that of step S103. With 3D-CAD, such an operation for selecting surfaces is essential in various operations.

However, the two surface selecting methods of the prior art described above involve many procedural steps for the purpose of selecting a desired surface. That is, with the former method, it is necessary to change the attitude of the 3D model so as to display a desired surface in order that the surface may be clicked. With the latter method, it is necessary to establish the surface selection mode by performing a prescribed operation and then highlight the desired surface.

Generally, a 3D-CAD operator, such as a product designer, must create attribute information such as several hundred to several thousand dimensions in a situation where the 3D model is complex. Consequently, repeating the above-described procedures whenever a surface is selected increases the burden upon the product designer, increases the number of man-hours involved in the product design process and, as a result, increases the number of man-hours for the overall component fabrication and lengthens the time needed for fabrication of the component. This means that if the above-described procedures could be dispensed with in the operation for selecting surfaces, the efficiency of the attribute-information input operation would be improved significantly.

SUMMARY OF THE INVENTION

Accordingly, an object of the present invention is to provide a surface selecting method, attribute information setting method and information processing apparatus whereby the operation for selecting the surfaces of a 3D model can be simplified, the burden upon the operator reduced and efficiency of operation improved.

According to the present invention, the foregoing object is attained by providing a surface selecting method in an information processing apparatus for selecting a prescribed surface of a 3D model displayed on a display unit of the information processing apparatus, comprising:

a display control step of controlling the display unit so as to display the 3D model;

a detection step of detecting an indication to an edge line formed by two adjoining surfaces of the 3D model displayed on the display unit;

a determination step of determining whether the indication is an indication to an edge line formed by a surface that is not being displayed on the display unit; and a selection step of selecting the surface, which is not being displayed on the display unit, as a prescribed surface if the indication is an indication to an edge line formed by a surface that is not being displayed on the display unit.

In accordance with an embodiment of the present invention, there is provided an information processing apparatus for selecting a prescribed surface of a 3D model displayed on a display unit of the information processing apparatus, comprising:

display control means for controlling the display unit so as to display the 3D model;

detection means for detecting an indication to an edge line formed by two adjoining surfaces of the 3D model displayed on the display unit;

determination means for determining whether the indication is an indication to an edge line formed by a surface that is not being displayed on the display unit; and selection means for selecting the surface, which is not being displayed on the display unit, as a prescribed surface if the indication is an indication to an edge line formed by a surface that is not being displayed on the display unit.

Other features and advantages of the invention will be apparent from the following description taken in conjunction with the accompanying drawings, in which like reference characters designate the same or similar parts throughout the figures thereof.

DETAILED DESCRIPTION OF THE PREFERRED EMBODIMENT

An embodiment of a surface selecting method, attribute information setting method and information processing apparatus will now be described with reference to the drawings. It should be noted that the surface selecting method, attribute information setting method and information processing apparatus are applied to a 3D-CAD system used in component design.

Figure 1:
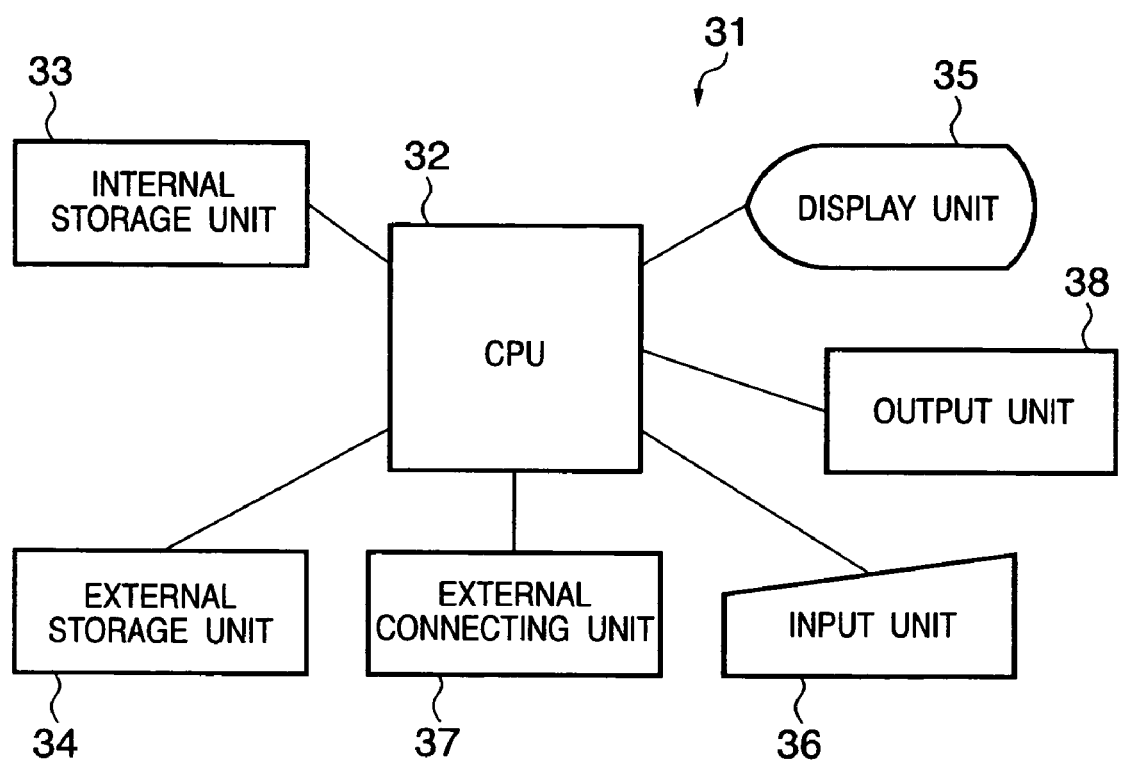
FIG. 1 is a block diagram illustrating the configuration of a 3D-CAD system according to an embodiment of the present invention.

FIG. 1 is a block diagram illustrating the configuration of a 3D-CAD system 31 according to an embodiment of the present invention. The 3D-CAD system 31 has the functions of an attribute layout plane setting unit for setting a virtual plane with which attribute information is associated, a storage unit for storing attribute information in association with a virtual plane, and an attribute information layout unit for placing attribute information in a virtual plane.

These functions are implemented by a controller (CPU) 32, internal storage unit 33, external storage unit 34, display unit 35, input unit 36, external connecting unit 37 and output unit 38. A semiconductor memory such as a RAM can be mentioned as an example of the internal storage unit 33. A magnetic storage device is an example of the external storage unit 34. CAD data and a three-dimensional CAD program or processing program according to this embodiment are stored in the external storage unit 34. The input unit 36 comprises a mouse and keyboard, etc. The output unit 38 outputs paper drawings or the like in accordance with a command from the CPU 32. Furthermore, the 3D-CAD system 31 is capable of being connected to an output unit such as a printer or plotter and to a server apparatus, etc., via the external connecting unit 37.

When a 3D-CAD program is launched by the operator via the input unit 36, the 3D-CAD program that has been stored in the external storage unit 34 is read into the internal storage unit 33 and executed by the CPU 32. The 3D-CAD program forms a 3D model in virtual space in accordance with operator instructions entered via the input unit 36.

Figure 2:
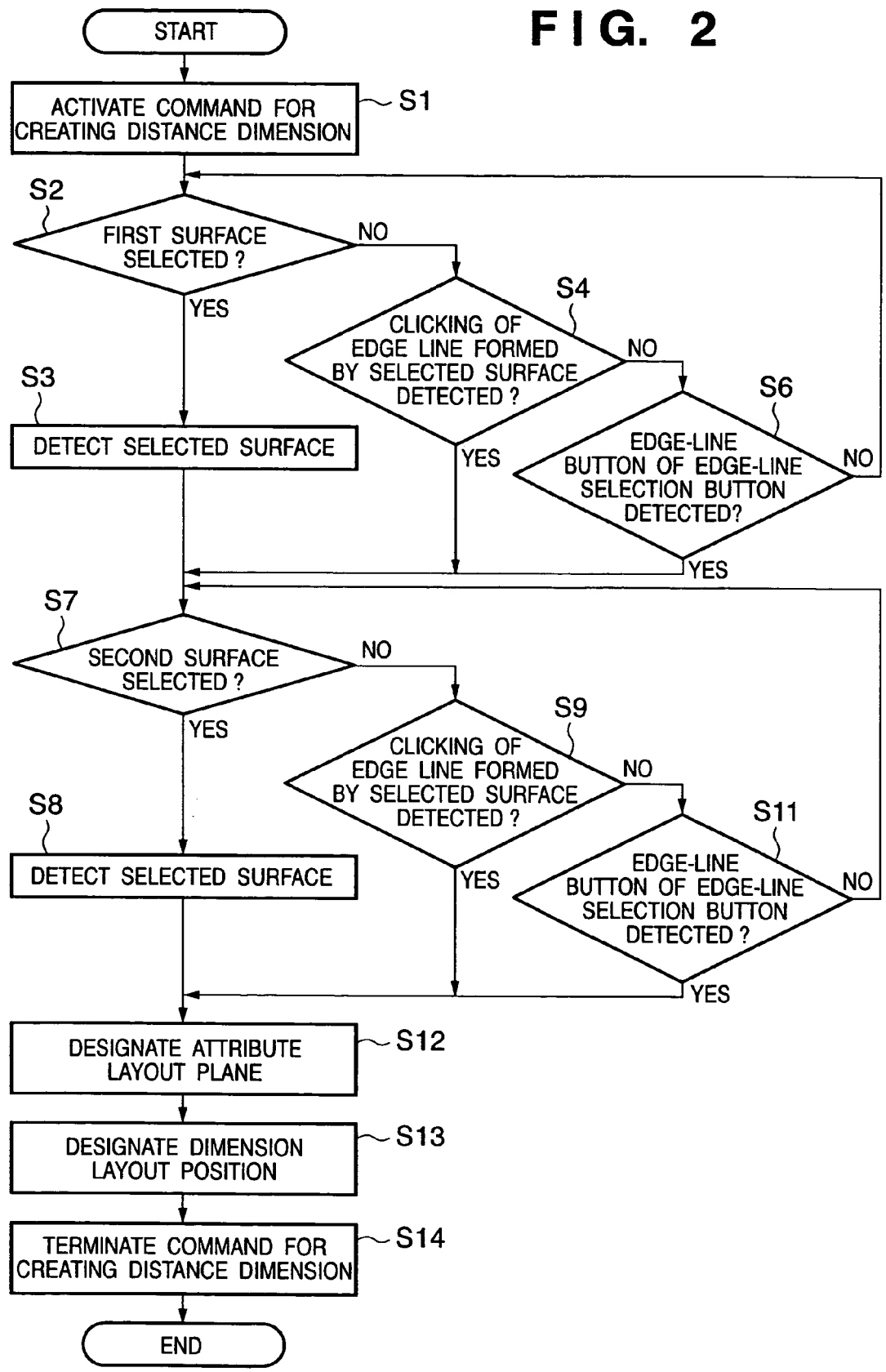
FIG. 2 is a flowchart illustrating processing involving a command for creating a distance dimension.
Figure 3:
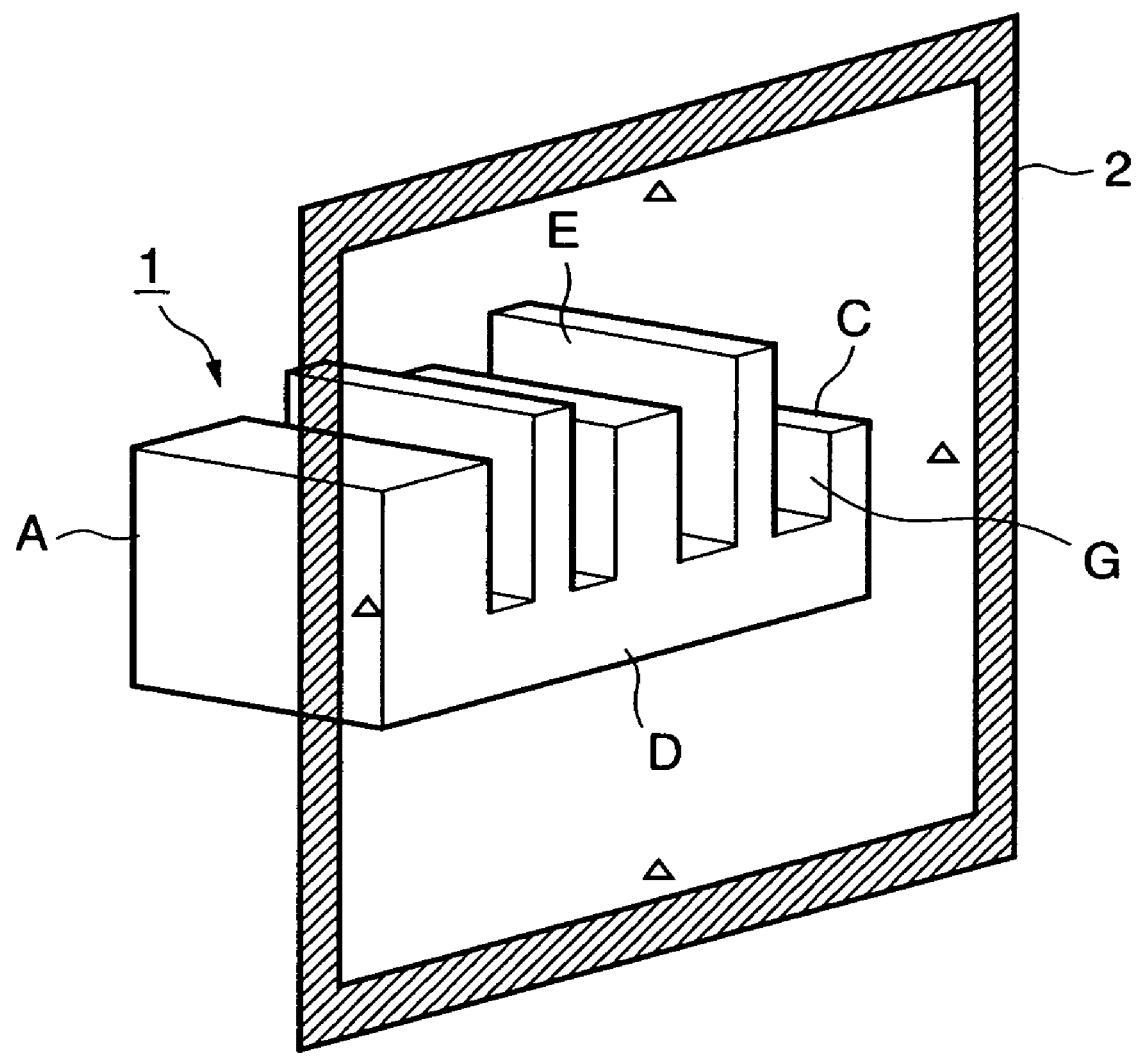
FIG. 3 is a diagram illustrating a 3D model and an attribute layout plane.
Figure 4:
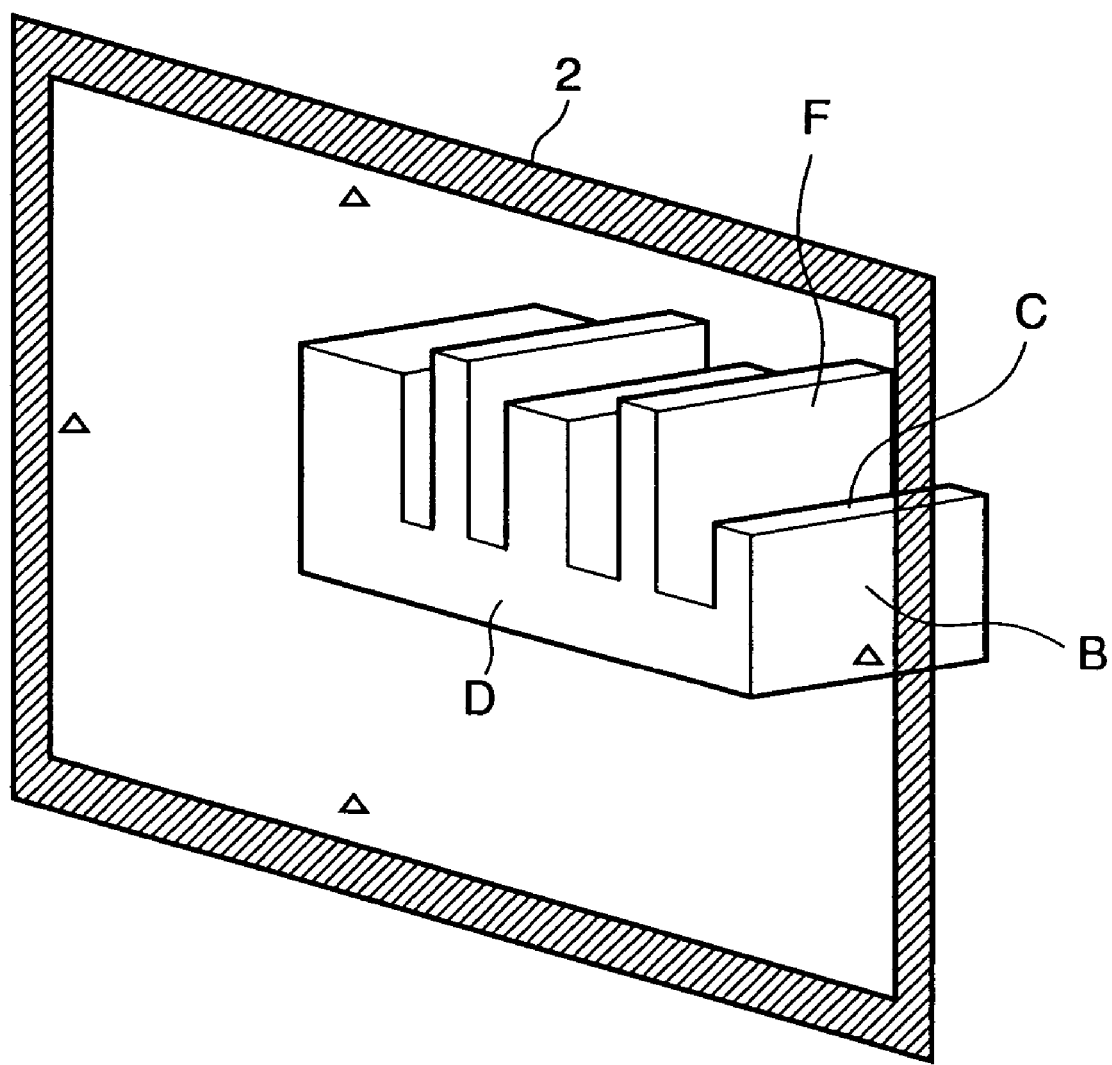
FIG. 4 is a diagram illustrating the 3D model and attribute layout plane as seen from a different line-of-sight direction.

FIG. 2 is a flowchart illustrating processing involving a command for creating a distance dimension. This processing program is stored in the external storage unit 34 and executed by the CPU 32. FIG. 3 is a diagram illustrating a 3D model and an attribute layout plane, and FIG. 4 is a diagram illustrating the 3D model and attribute layout plane as seen from a different line-of-sight direction. In this embodiment, a component (3D model) having a comparatively simple shape is used in order to simplify the description. However, it goes without saying that the invention is also applicable to a component of a complicated shape having several hundred to several thousand elements. As illustrated in FIGS. 3 and 4, an attribute layout plane 2 has been set for a 3D model 1. The attribute layout plane 2 has been set so as to lie parallel to a surface D and so as to be spaced away from the surface D by a prescribed distance. The dimension to be input with respect to the 3D model 1 is created with any surface of the 3D model 1 serving as an element, and an extension line is drawn from any apex contained in the surface.

FIG. 2 illustrates the processing of an operation for inputting a distance dimension. This operation includes the operation for selecting a surface. Here an operation for inputting a distance dimension 2a between surfaces A and B will be described in detail. The state of the display on the screen of the display unit 35 of the 3C-CAD system at the time of dimension input is assumed to be as illustrated in FIG. 3. Further, the processing of the operation for inputting a distance dimension is executed in the following sequence: activate a command that is for inputting the distance dimension; select a first surface; select a second surface; specify the associated attribute layout plane; decide the dimension position; and deactivate the command that is for inputting the distance dimension.

Figure 5:
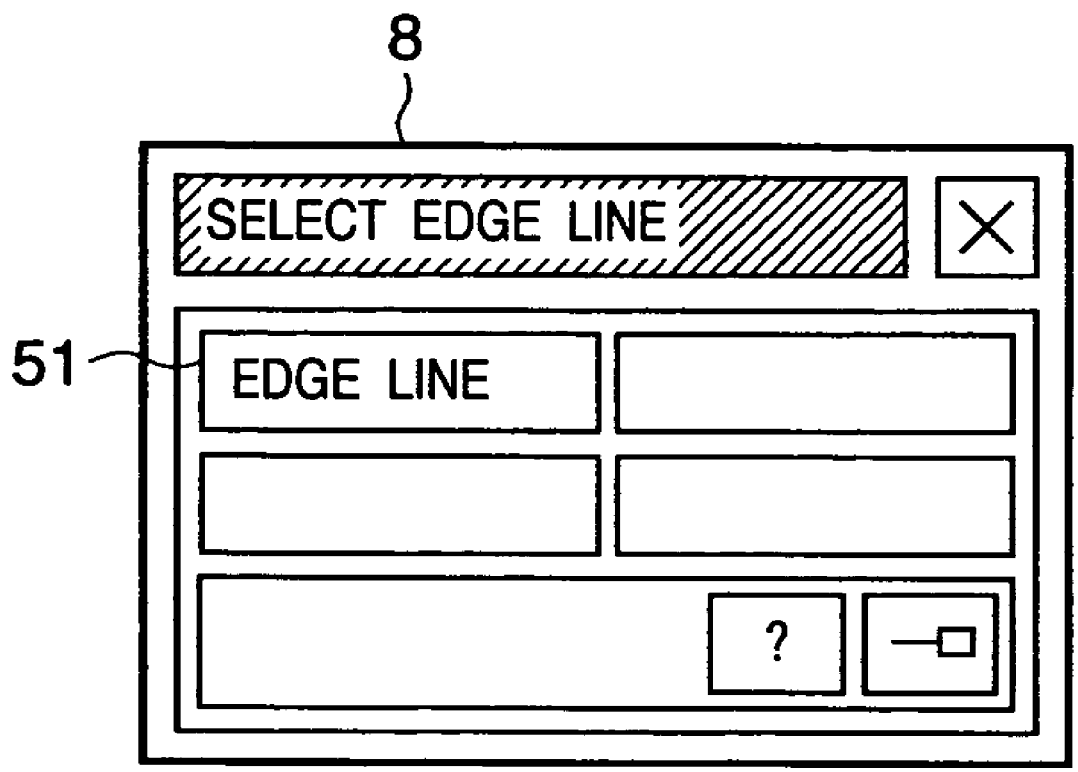
FIG. 5 is a diagram illustrating an edge-line selecting window.

First, a command for creating a distance dimension is input by the operator from the input unit 36 (step S1). The operator inputs the command by selecting creation of a distance dimension from an attribute information creating menu (not shown) included in the 3D-CAD menu. When the command for creating the distance dimension is input, an edge-line selecting window 8 shown in FIG. 5 is displayed. The edge-line selecting window 8 is provided with an edge-line button 51.

Figure 6:
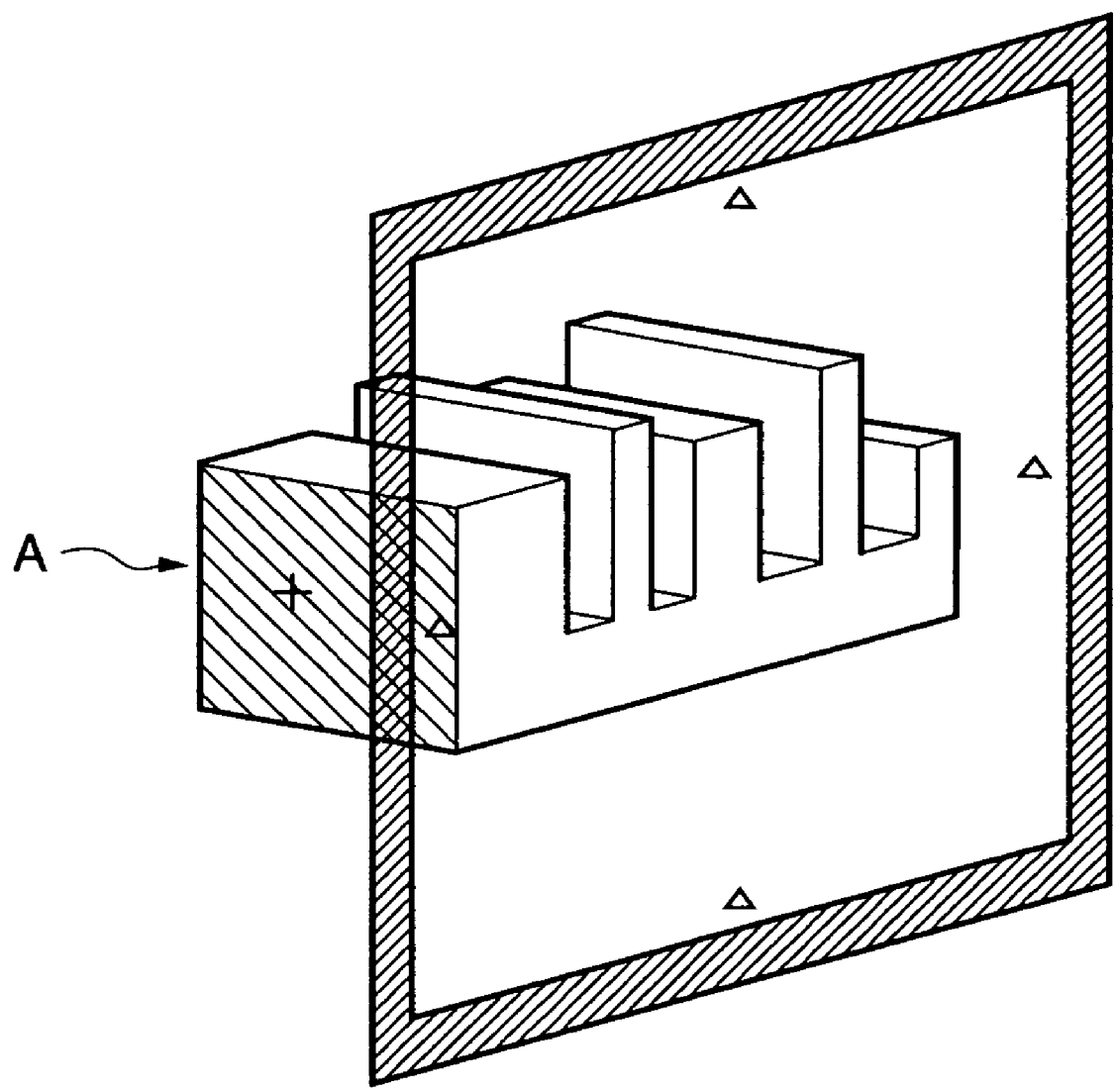
FIG. 6 is a diagram illustrating a state which prevails when a surface A has been clicked.

Next, processing transitions to a procedure for selecting the first surface A (step S2). If the surface to be selected is being displayed, then, in FIG. 3, for example, the surface A will be in the displayed state on the display unit. The surface A, therefore, is selected by clicking it. FIG. 6 is a diagram illustrating a state which prevails when the surface A has been clicked. The fact that surface A has been selected is detected (step S3). When this occurs, the surface A is highlighted until completion of the dimension input in such a manner that the surface whose dimension is being input will be easy for the operator to discern. The term "highlight" means to display the surface in an identifiable manner. In this embodiment, the color of the surface is changed to make it different from other portions. Even if the state of the display is such that the highlighted element is hidden by another element, the surface is made visible as in the manner of surface B shown in FIG. 8.

Figure 7A:
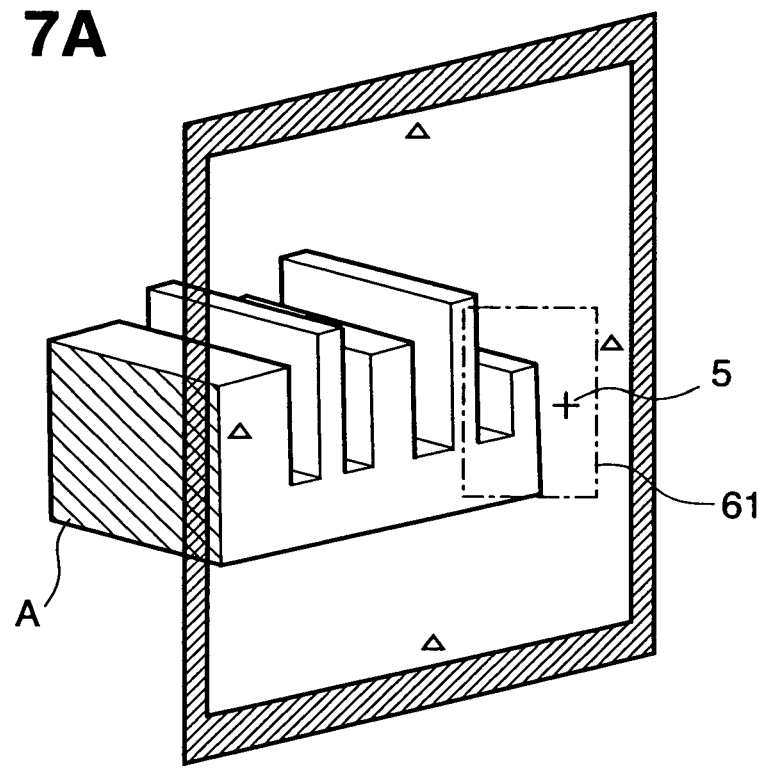
FIGS. 7A and 7B are diagrams illustrating a state in which an edge line formed by a surface B is being displayed.
Figure 7B:
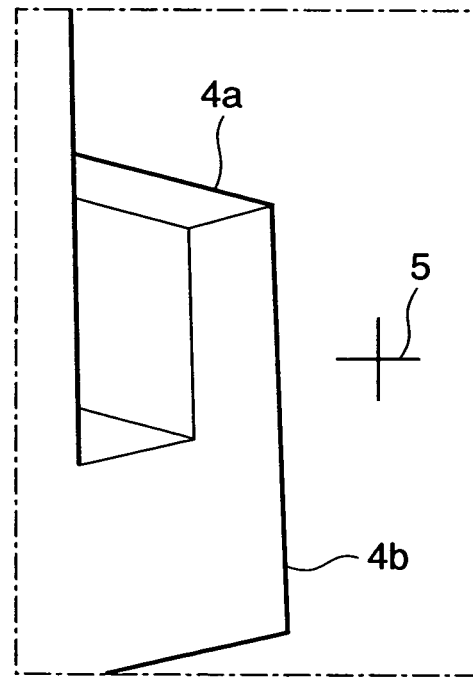
Figure 8:
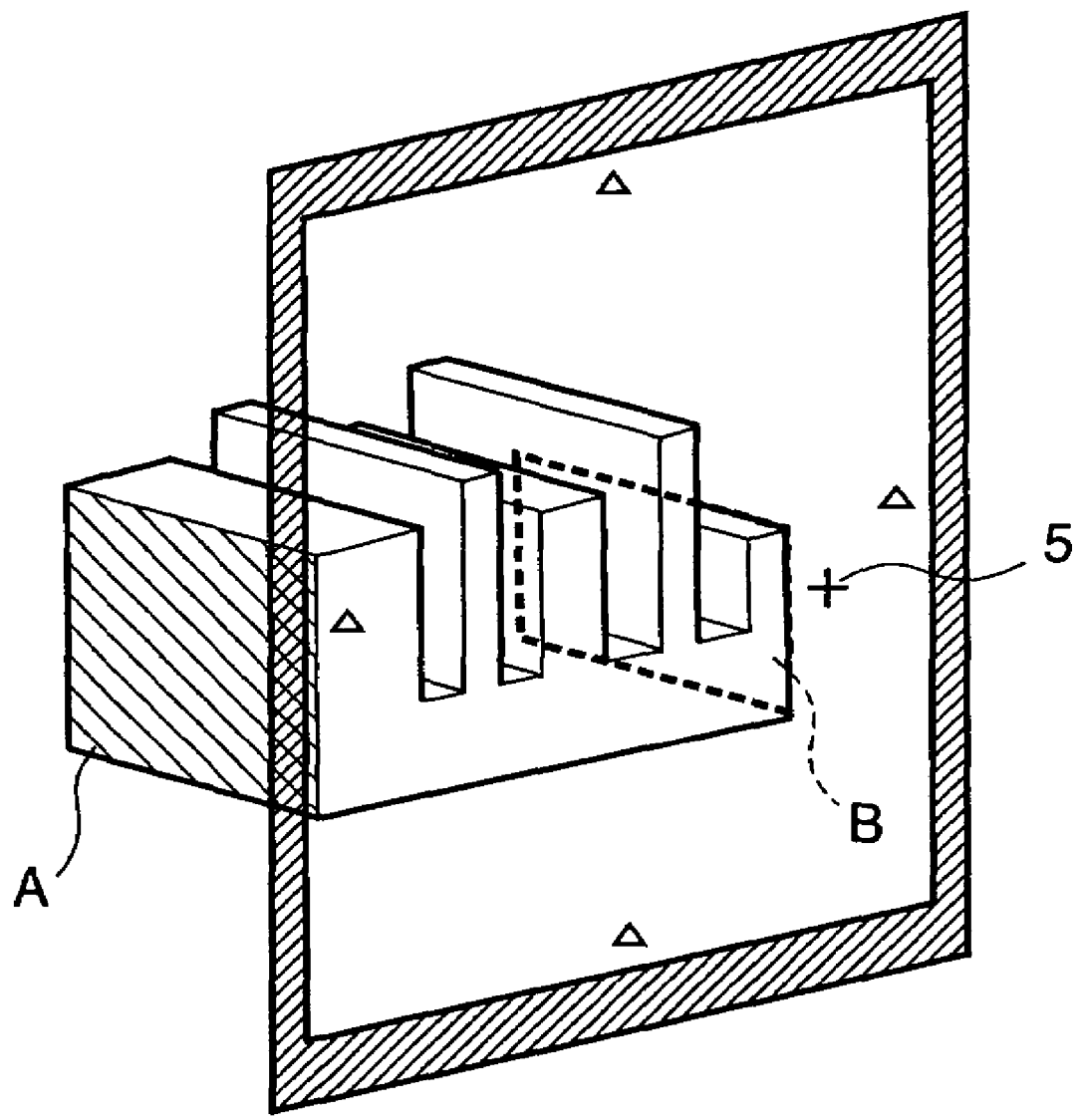
FIG. 8 is a diagram illustrating a surface B in a highlighted state.

Next, after the surface A has been selected, processing transitions to a procedure for selecting the second surface B (step S7). If the surface B is being displayed and selection of second surface B is detected (step S8), then the two surfaces for which a dimension is to be input are decided and control proceeds to step S12. On the other hand, in a case where the second surface B to be selected is indicated by, e.g., a phantom frame, the second surface B is hidden by other portions of the 3D model 1 and therefore is not displayed, as illustrated in FIG. 8. This means that surface B cannot be selected by clicking it. Accordingly, if the decision rendered at step S7 is that the surface to be selected is not being displayed and, moreover, an edge line formed by the surface to be selected is being displayed, then the operator is capable of selecting the surface by selecting the edge line formed by the surface to be selected. That is, if selection of an edge line is detected at step S9, then, from among the surfaces that adjoin the detected edge line, the surface not being displayed is set as the object of selection with a priority higher than that of the surfaces that are being displayed. FIGS. 7A and 7B are diagrams illustrating a state in which an edge line formed by surface B is being displayed. The edge line formed by the surface B is being displayed in FIG. 7A in a zone enclosed by a phantom frame 61. In FIG. 7B, the zone enclosed by the phantom frame 61 of FIG. 7A is illustrated in enlarged form. Since edge lines 4a, 4b formed by surface B are being displayed, surface B can be selected by selecting either edge line 4a or edge line 4b. It should be noted that in a case where all of the surfaces that form an edge line are displayed, processing for inhibiting selection of a surface is executed even if selection of the edge line has been detected.

When the edge lines 4a, 4b are selected, it is not necessary to position the cursor on the edge lines exactly. If the cursor is brought close to either edge line 4a or 4b before the clicking operation, the surface B will be highlighted. FIG. 8 is a diagram illustrating the surface B in the highlighted state. The phantom frame in FIG. 8 corresponds to the surface B. Further, in this embodiment, "bringing the cursor close" means bringing it within a distance of 3 mm on the display. If a plurality of edge lines are within this zone, the closest to the cursor will be highlighted. If clicking is performed in the highlighted state, the surface being highlighted can be selected.

According to this embodiment, as described above, clicking an edge line formed by a surface not being displayed makes it possible to select the surface that is not being displayed. An edge line always is generated from two surfaces. The set-up is such that if the edge line is clicked, the surface not being displayed is selected preferentially.

Figure 9:
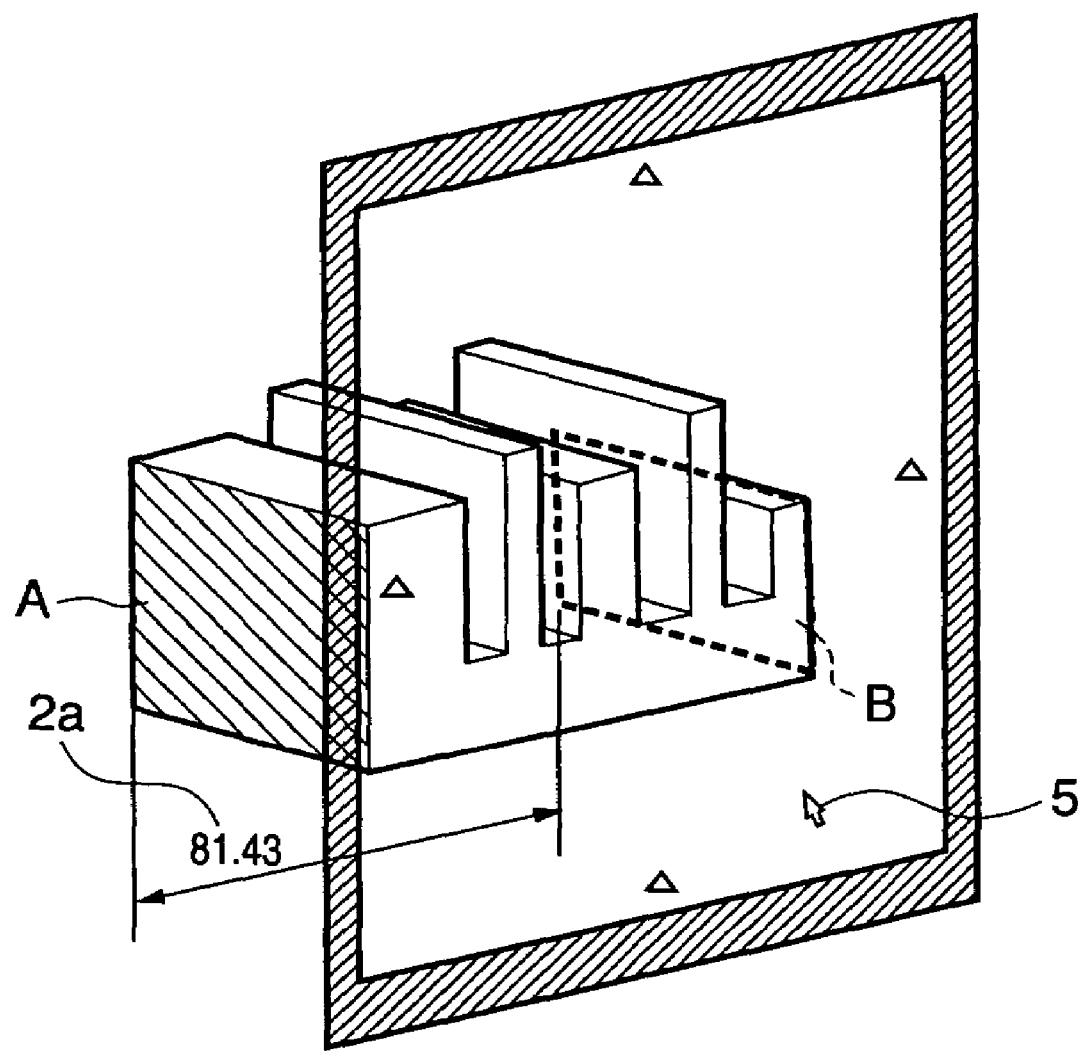
FIG. 9 is a diagram illustrating a state which prevails when a dimension has been displayed by selection of a surface B.

Thus, by detecting selection of edge line 4a or edge line 4b in the state of display shown in FIGS. 7A and 7B, it is possible to select surface B. If surface B is selected and the two surfaces are decided, then the dimension (distance dimension) 2a is displayed. FIG. 9 is a diagram illustrating a state which prevails when a dimension has been displayed by selection of the surface B. At this time the display position of the dimension has not been finalized and the position follows up movement of the mouse cursor 5. Further, surfaces A and B for which the dimension is being input are highlighted at this time. It should be noted that the dimension input at this time may be one calculated from the 3D model automatically by the 3D-CAD system or-one input numerically by the operator beforehand from the input unit.

Figure 10A:
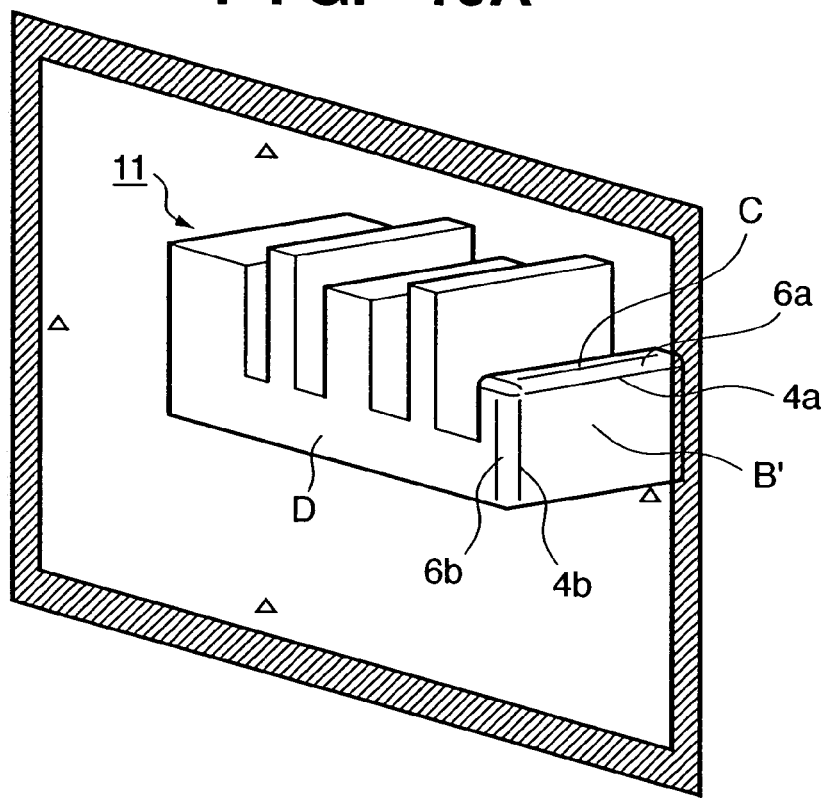
FIGS. 10A and 10B illustrate a state in which a surface B' is being displayed in another 3D model.
Figure 10B:
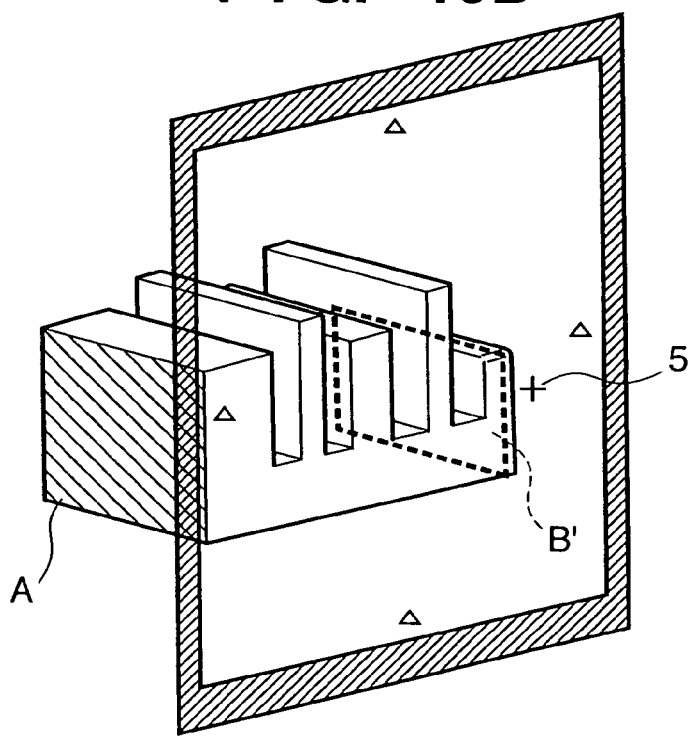

FIGS. 10A and 10B illustrate a state in which a surface B' is being displayed in another 3D model. In a case where a 3D model for which a dimension is to be input provisionally is a 3D model 11 having curved shapes 6a, 6b between surface B' and surfaces C, D, respectively, that are being displayed, as illustrated in FIG. 10A, the edge lines 4a, 4b of surface B' will be hidden by the curved portions and will not be displayed. This means that selection of surface B' by clicking the position of the edge line cannot be carried out. In such case the edge-line button 51 in the edge-line selecting window 8 (see FIG. 5) is selected. If the cursor 5 is subsequently brought close to the edge line, then the surface B' will be highlighted by the phantom frame, as illustrated in FIG. 10B. By performing the selection in a state in which the surface B' is highlighted, the surface B' can be selected. That is, after selection of the edge-line button 51 in the edge-line selecting window 8 is detected at step S11, selection of either edge line 4a or 4b is detected at step S10, whereby selection of surface B' is performed.

Operation is as follows in a case where surface A, which is the first surface to be selected, is not being displayed: If selection of the edge line is detected at step S4, then, from among the surfaces that adjoin the detected edge line, the surface not being displayed is set as the target of selection with a priority higher than that of the surface that is being displayed. This is similar to the above-described case where surface B' is not being displayed. Further, in a case where an edge line cannot be selected because it has a curved shape, the surface B' will be selected in response to detection of selection of the edge-line button 51 in the edge-line selecting window 8 at step S6.

Figure 11:
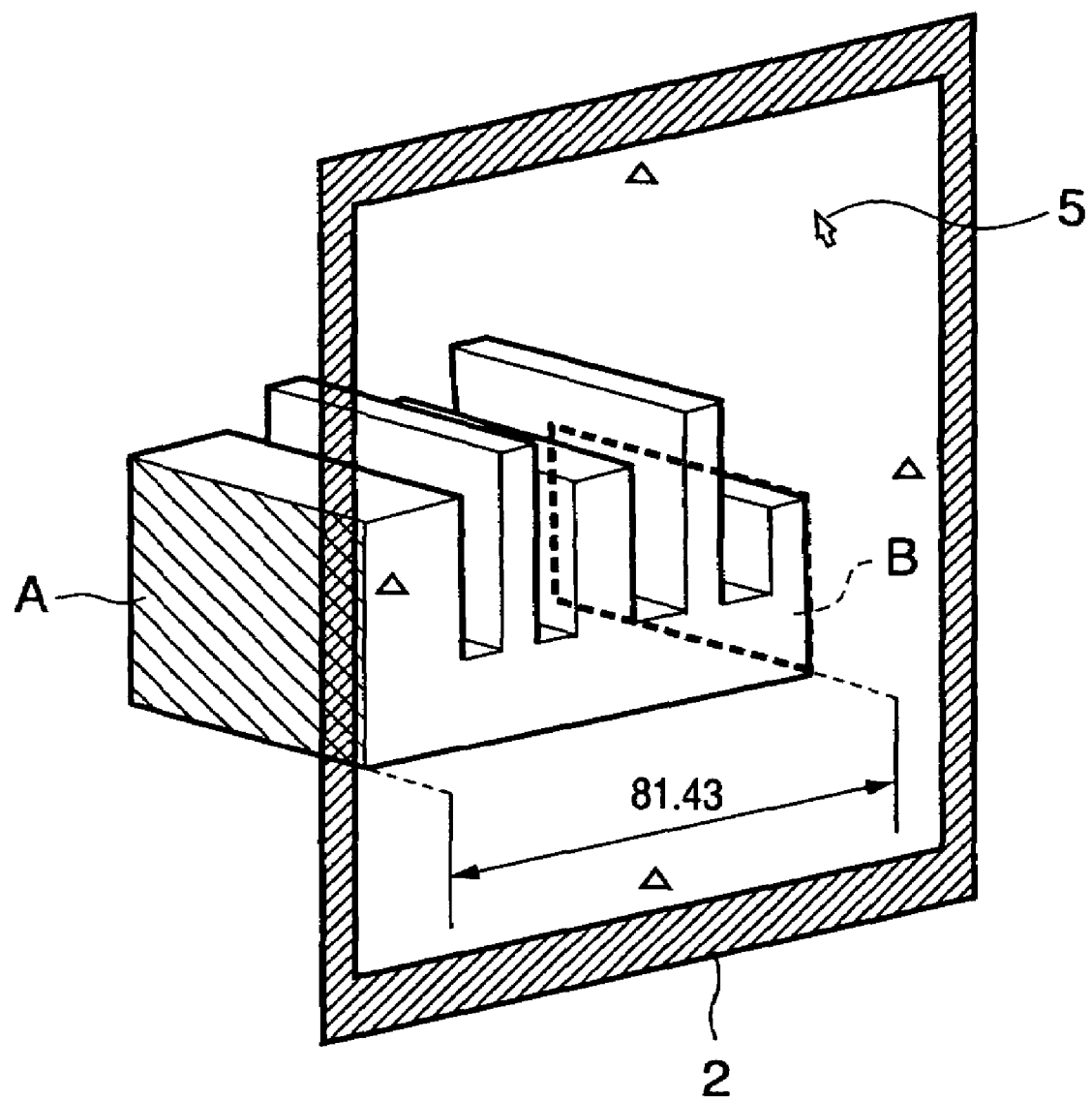
FIG. 11 is a diagram illustrating a distance dimension placed in an attribute layout plane.

Next, designation by the operator of the attribute layout plane 2 for associating the distance dimension 2a is detected (step S12). The distance dimension 2a is capable of being placed in the attribute layout plane 2 by designating the attribute layout plane 2. FIG. 11 is a diagram illustrating a distance dimension placed in an attribute layout plane. Under these conditions, the distance dimension 2a is moved in the attribute layout plane 2 in accordance with movement of the cursor 5. However, the position of the moved distance dimension is limited to the attribute layout plane 2. If selection of any position in the attribute layout plane 2 is detected, the position of the distance dimension 2a is decided in accordance with this detection.

Figure 12:
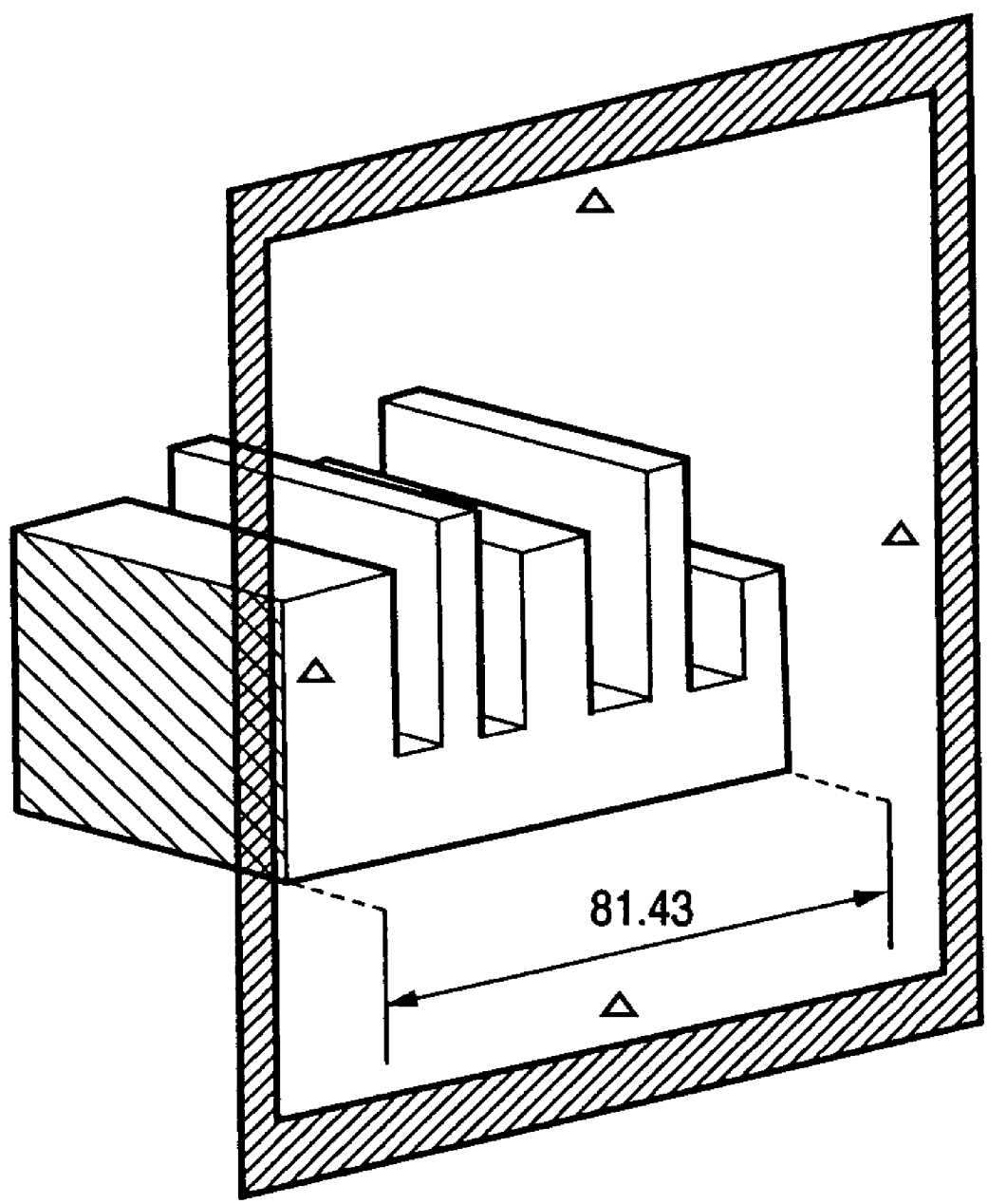
FIG. 12 is a diagram illustrating the position of a decided distance dimension.

FIG. 12 is a diagram illustrating the position of a decided distance dimension. When this operation is completed, the highlighted surfaces A and B are restored to the usual state. By clicking a dimension-input completion button (not shown), the command for creating the distance dimension is terminated (step S14) and this processing is exited.

A distance dimension, which is attribute information, is input to the 3D model through this procedure. The distance dimension that has been input is placed in the attribute layout plane in order to input and utilize attribute information efficiently. In the above-described operation for inputting a distance dimension, the illustrated case is such that surface A, which is being displayed in the first surface selection, and surface B, which is not being displayed in the second surface selection, are selected. However, the order may be reversed. That is, it may be so arranged that surface B, which is not being displayed in the first surface selection, and surface A, which is being displayed in the second surface selection, are selected.

Thus, with the 3D-CAD system of this embodiment, it is possible to simplify the operation for selecting two surfaces for which distance dimension is input. In other words, regardless of whether a surface to be selected is being displayed or not, the surface selecting operation is completed by a single click as long as the adjoining edge line is being displayed. Moreover, even if the surface to be selected is not being displayed and the edge line is hidden as by a curved shape, the surface selecting operation is completed by two clicks. Accordingly, the operation for selecting surfaces can be performed efficiently.

More specifically, according to this embodiment, if a desired surface is not being displayed because it is hidden, the desired surface can be selected by clicking the edge line that the surface forms. The surface selecting operation, therefore, is simplified.

In the embodiment described above, an operation for inputting a distance between two surfaces is illustrated as a surface selecting operation. However, this does not impose a limitation upon the present invention. The present invention is applicable to surface selecting operations in general, such as in the coloring of a surface, the input of an angle dimension between two surfaces and the creation of an attribute layout plane by designating an angle with respect to a certain surface. Further, when an edge line is clicked under conditions settable together with the surface and edge line, as in a case where an element that is capable of being input to an edge line per se is input, it becomes necessary to designate whether to select the edge line itself or the adjoining surface.

Figure 13:
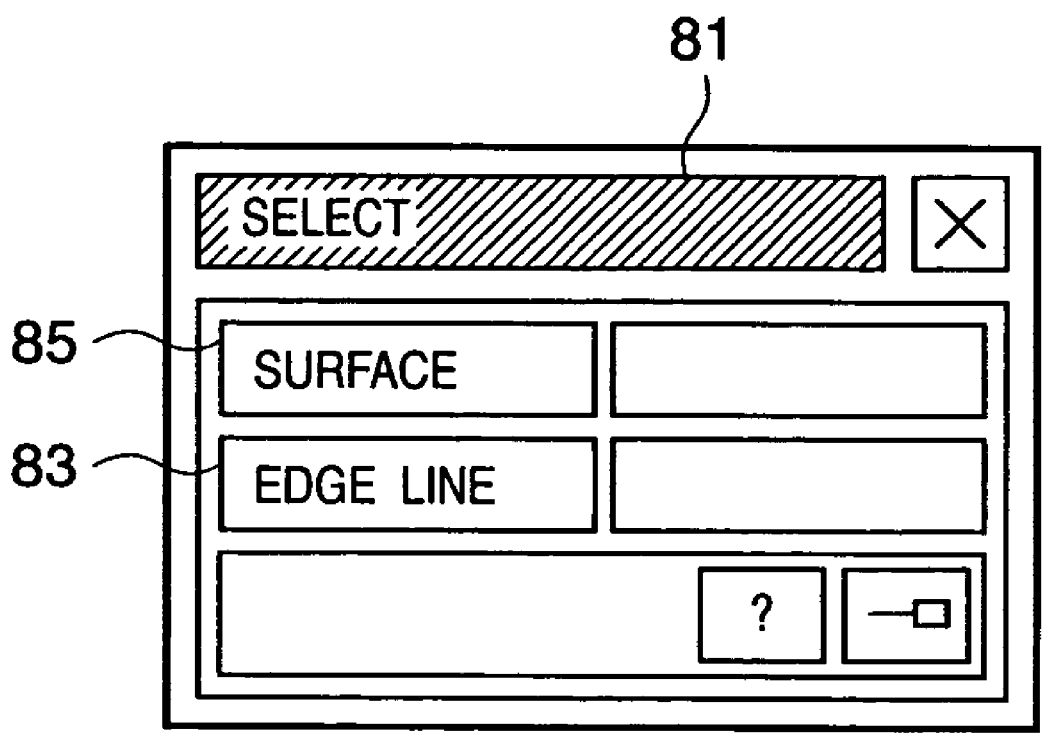
FIG. 13 is a diagram showing a selecting window.
Figure 14:
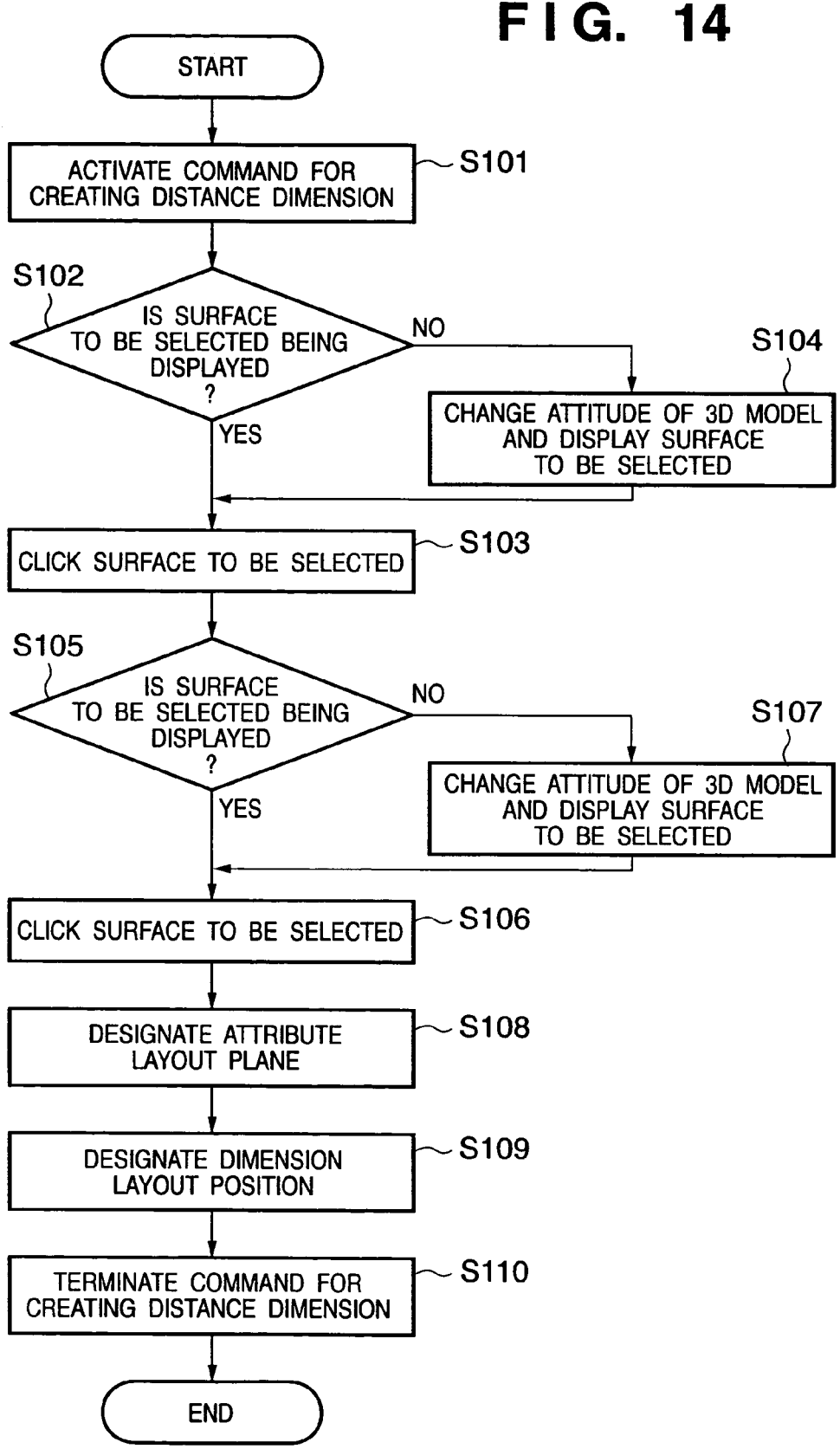
FIG. 14 is a flowchart illustrating the processing of an operation for inputting a distance dimension according to the prior art.
Figure 15:
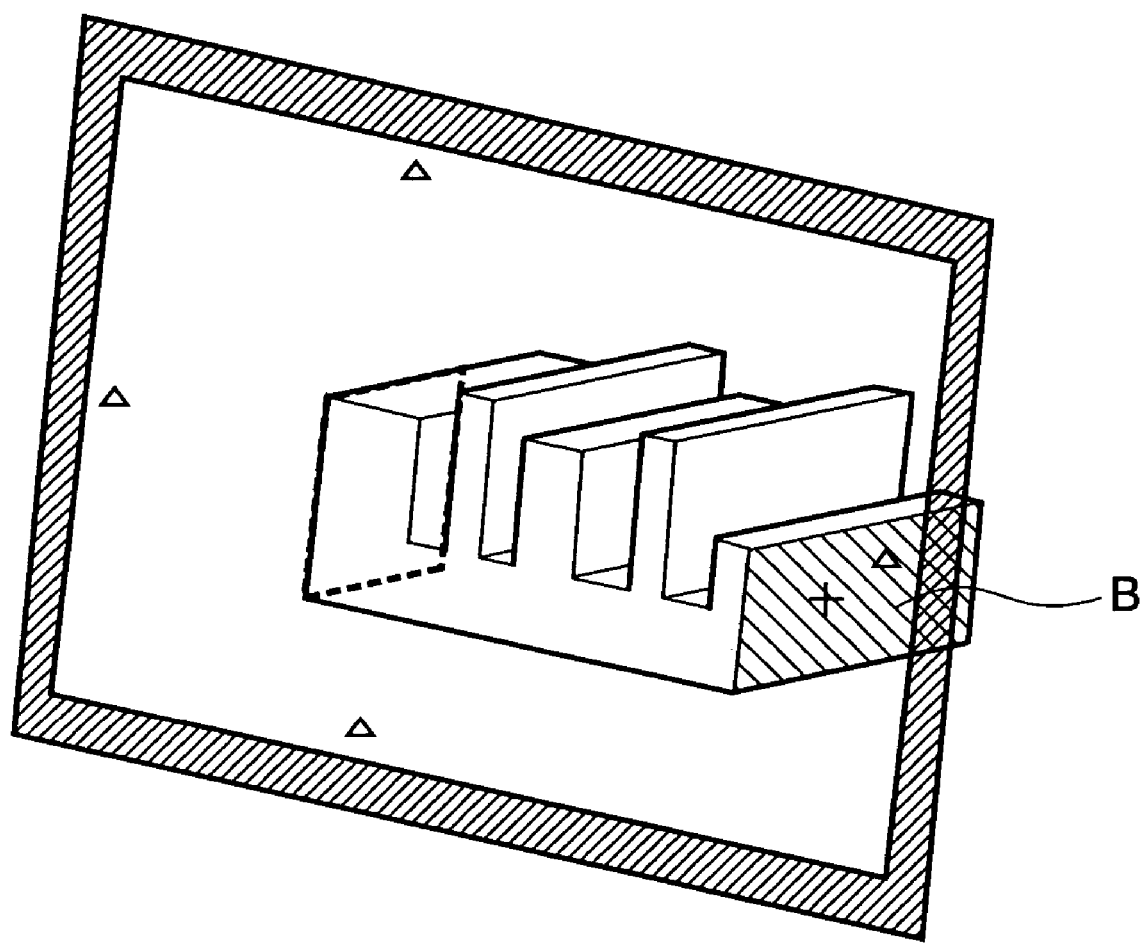
FIG. 15 is a diagram illustrating a state in which a surface B is displayed.
Figure 16:
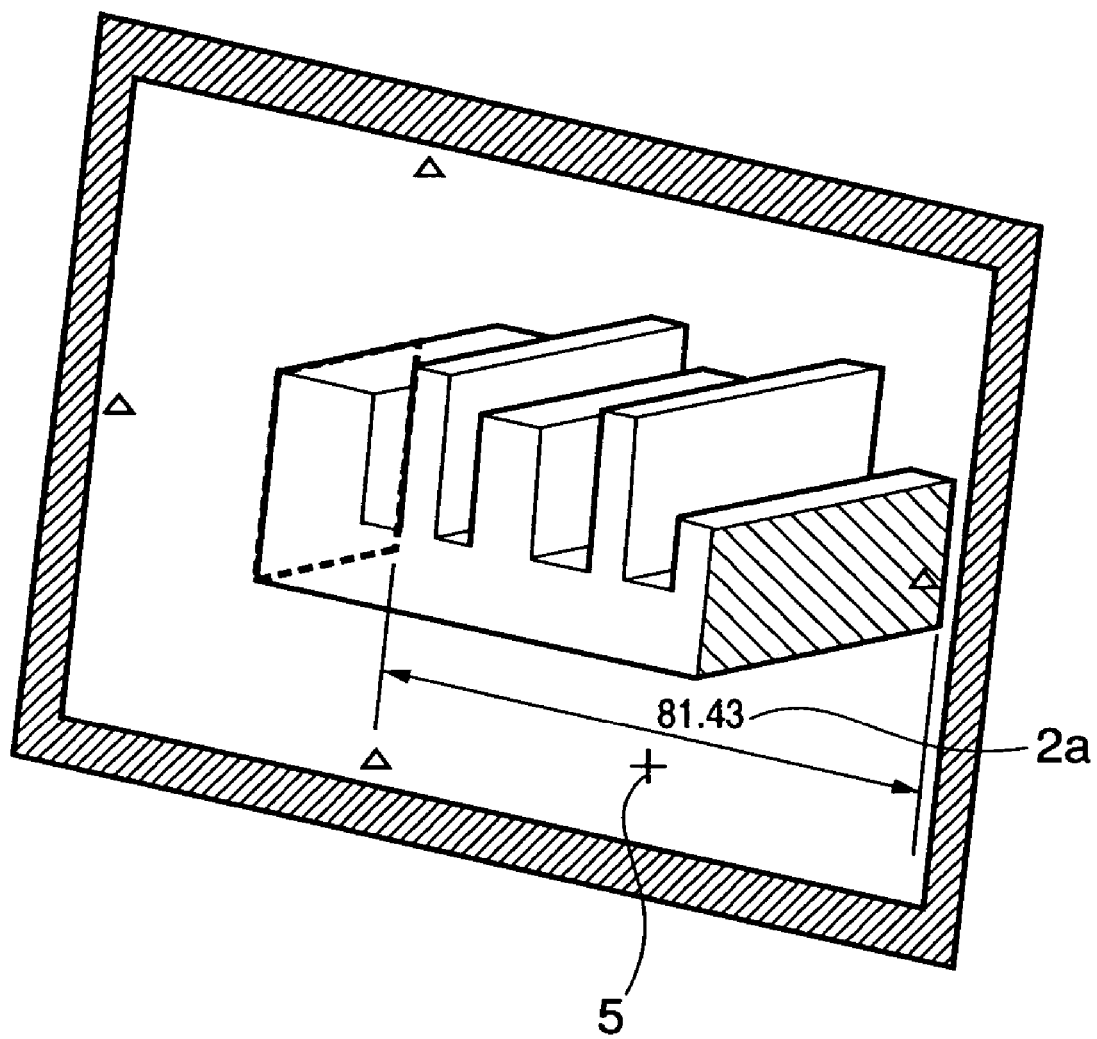
FIG. 16 is a diagram illustrating a state in which an dimension is displayed.
Figure 17:
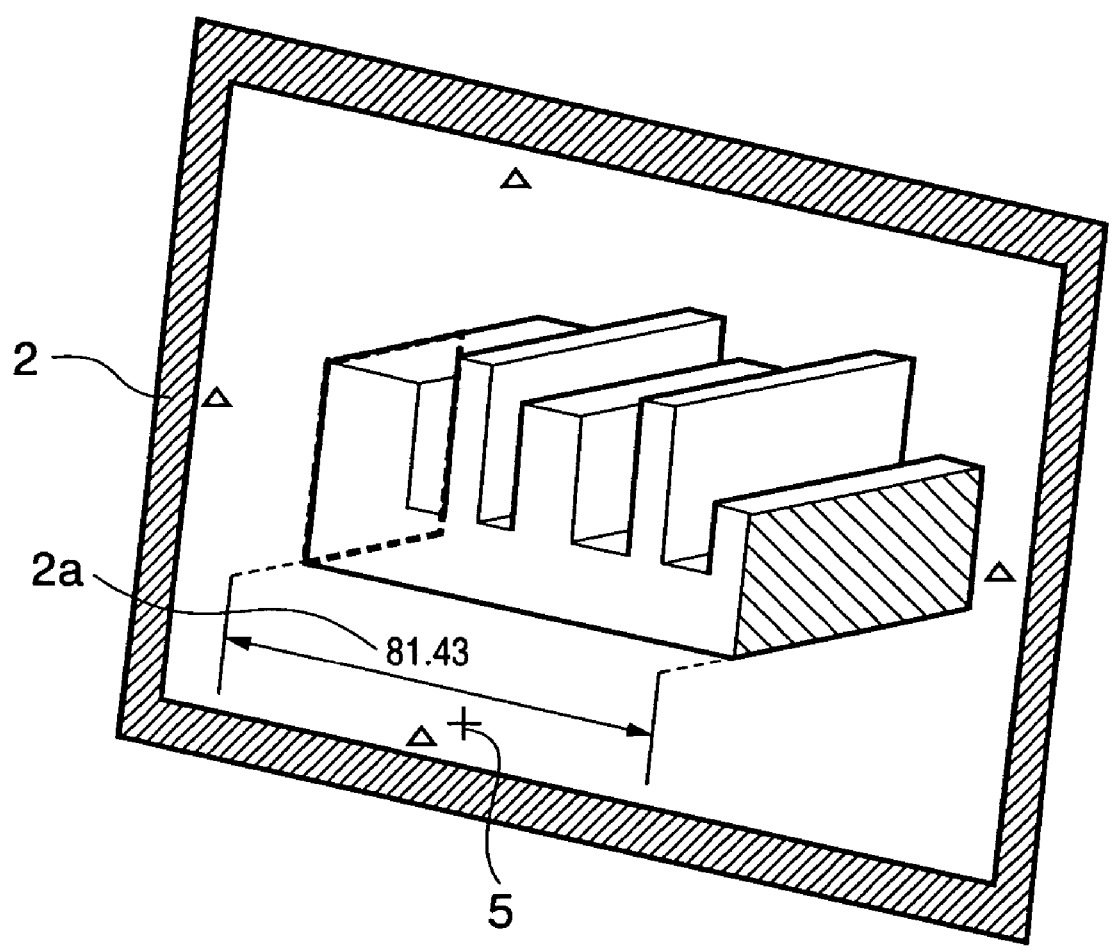
FIG. 17 is a diagram illustrating a state in which the position of a distance dimension is limited to the attribute layout plane.
Figure 18:
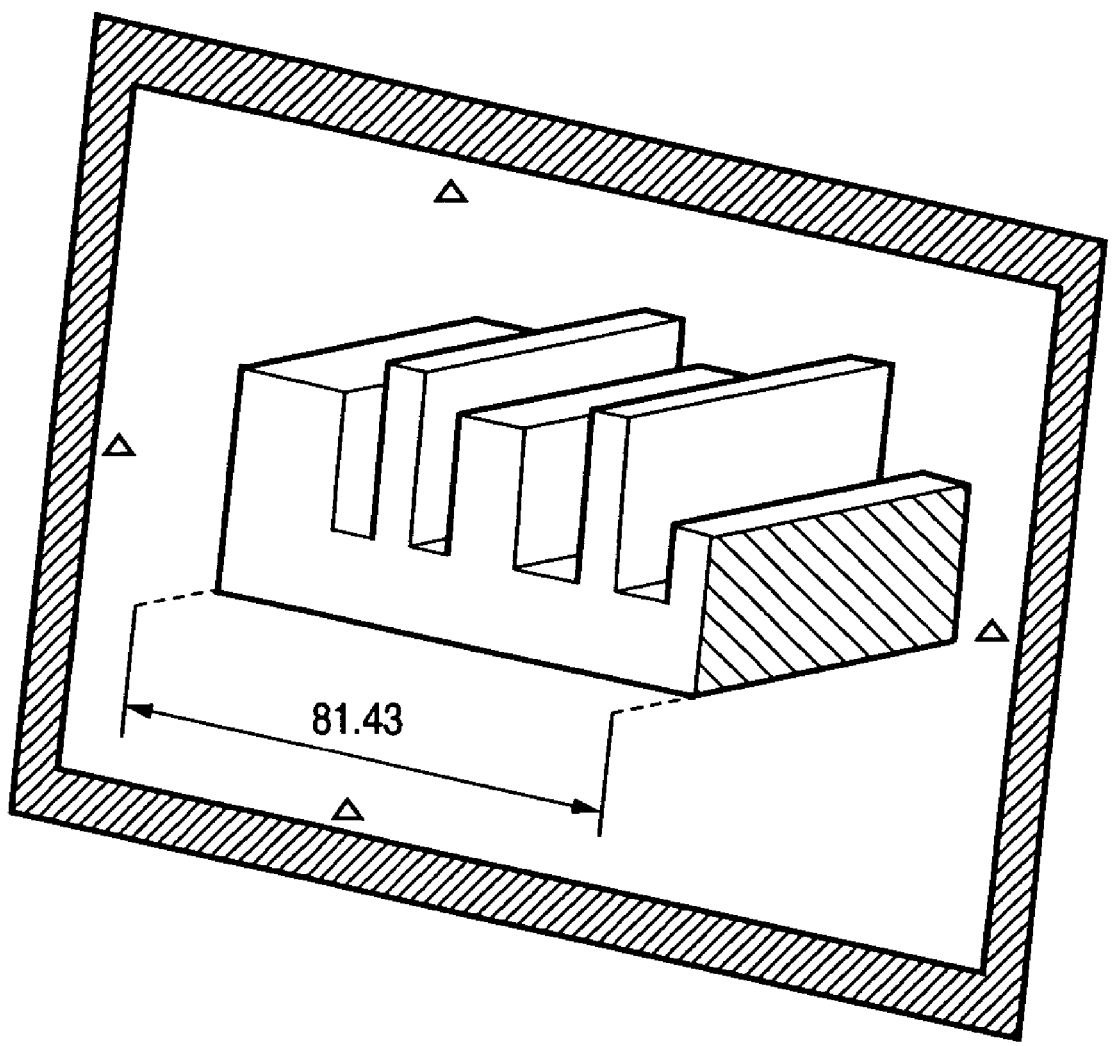
FIG. 18 is a diagram illustrating a state in which the position of a distance dimension has been decided.
Figure 19:
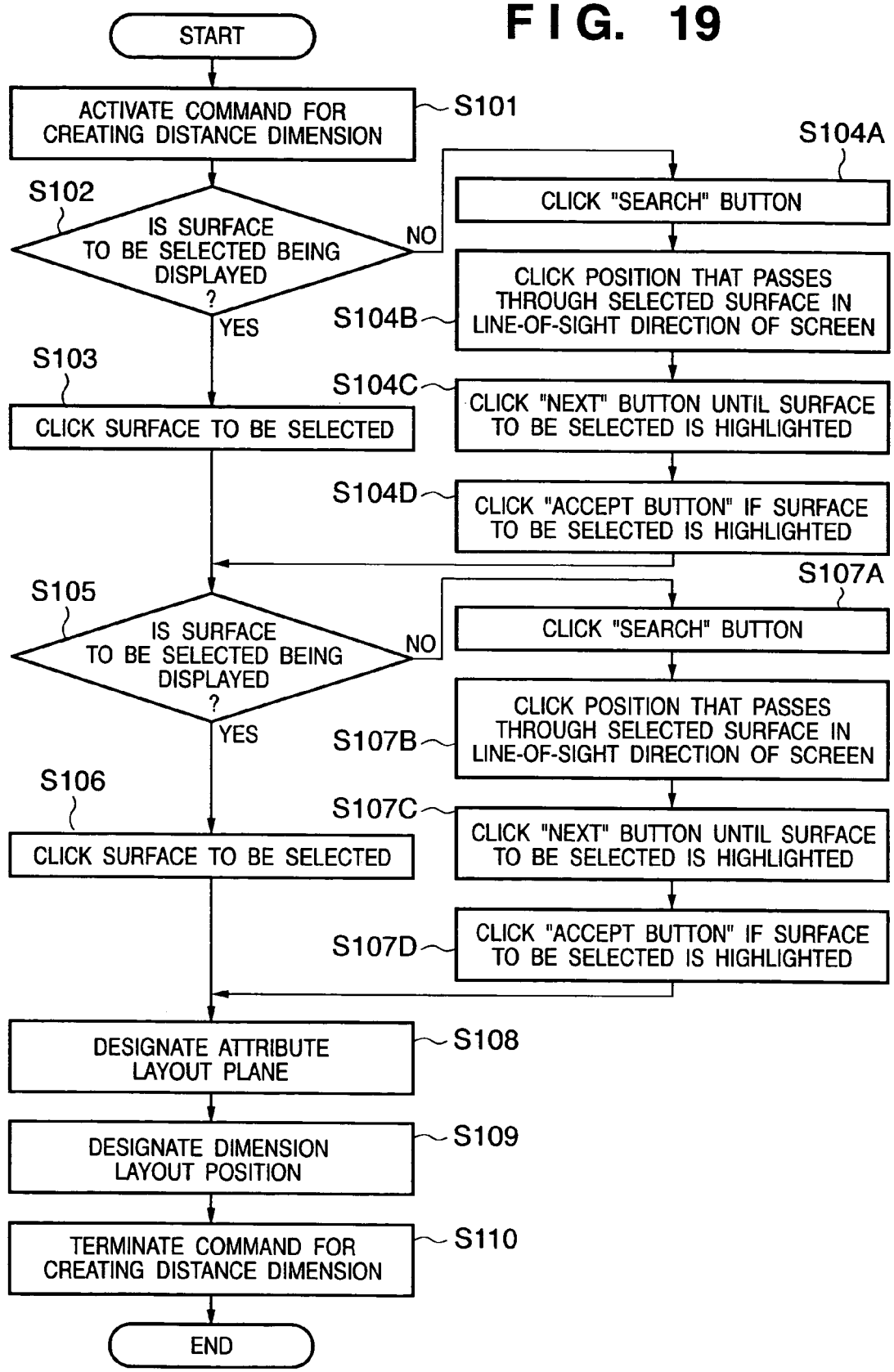
FIG. 19 is a flowchart illustrating the processing of an operation for inputting a distance dimension according to another example of the prior art.
Figure 20:
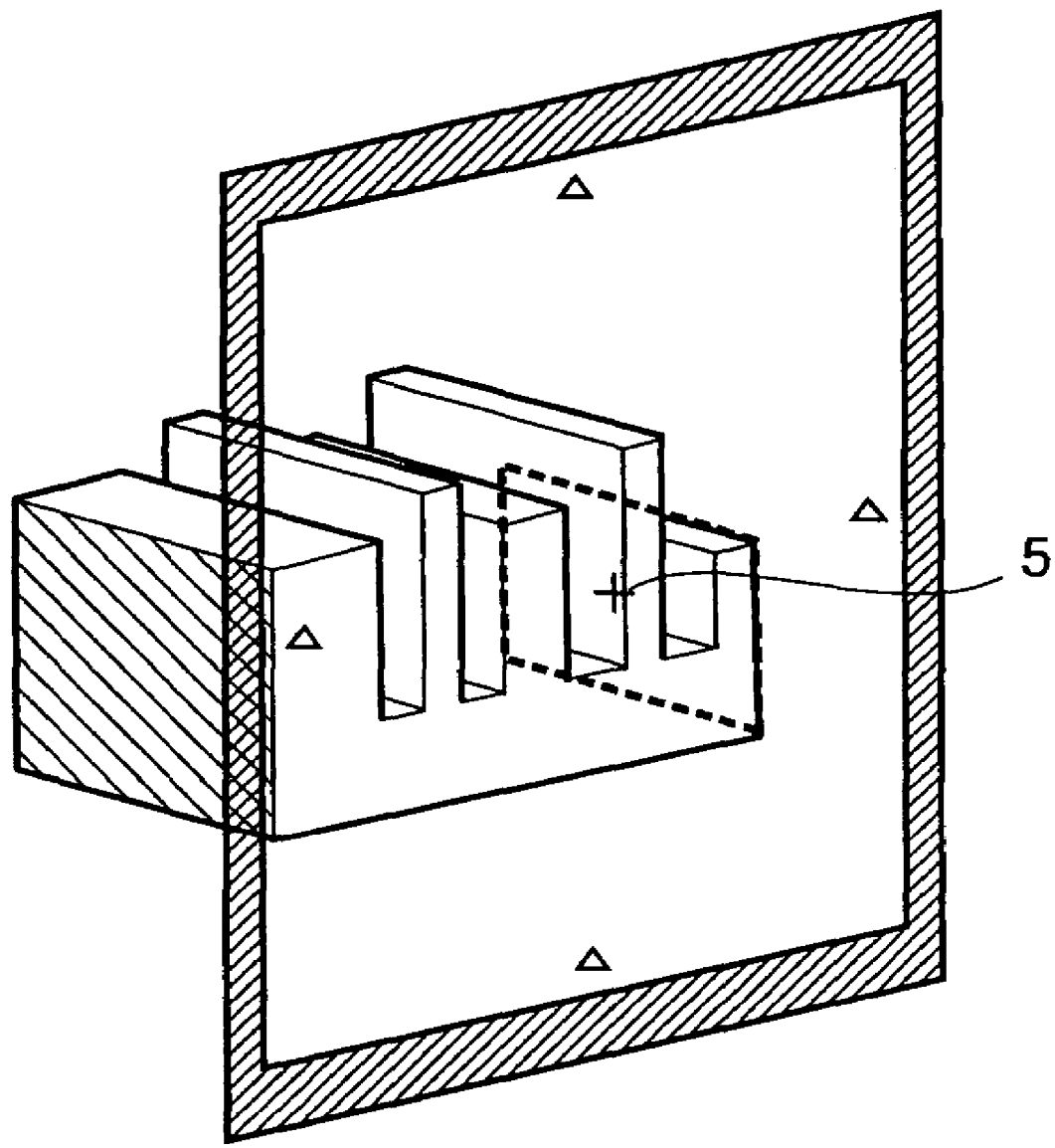
FIG. 20 is a diagram illustrating the state of a display in a surface selection mode.
Figure 21A:
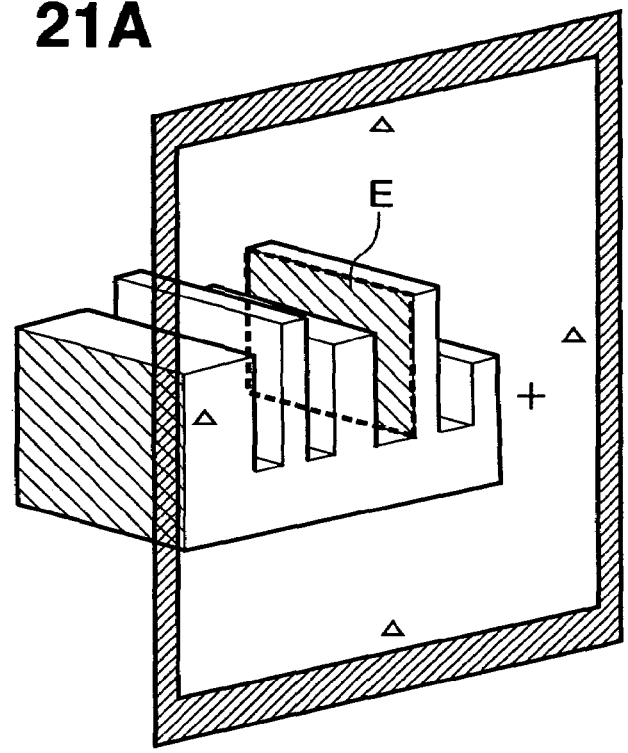
FIGS. 21A and 21B are diagrams illustrating a procedure for selecting a surface.
Figure 21B:
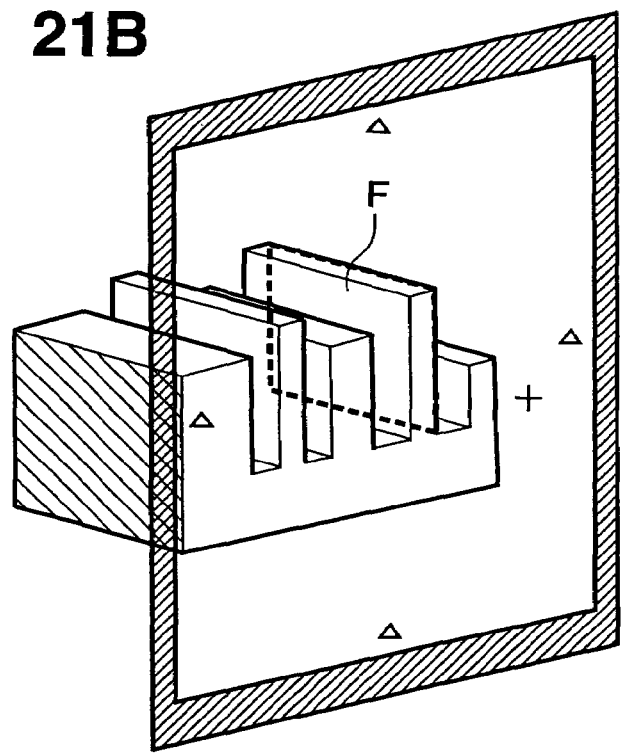
Figure 22A:
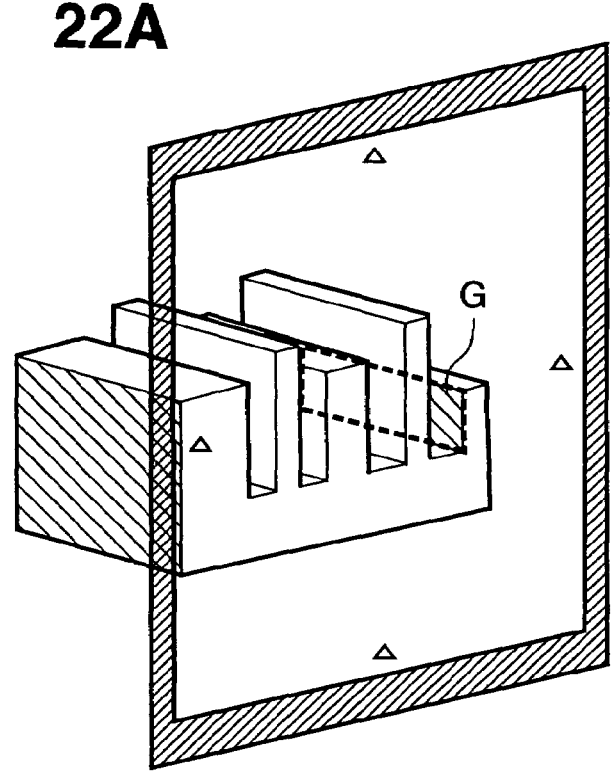
FIGS. 22A and 22B are diagrams illustrating a procedure for selecting a surface based upon FIG. 21B.
Figure 22B:
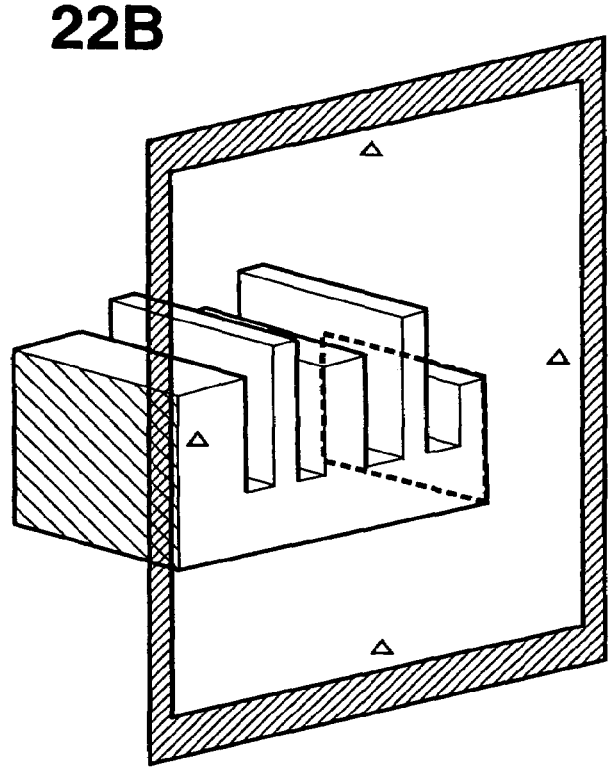
Figure 23:
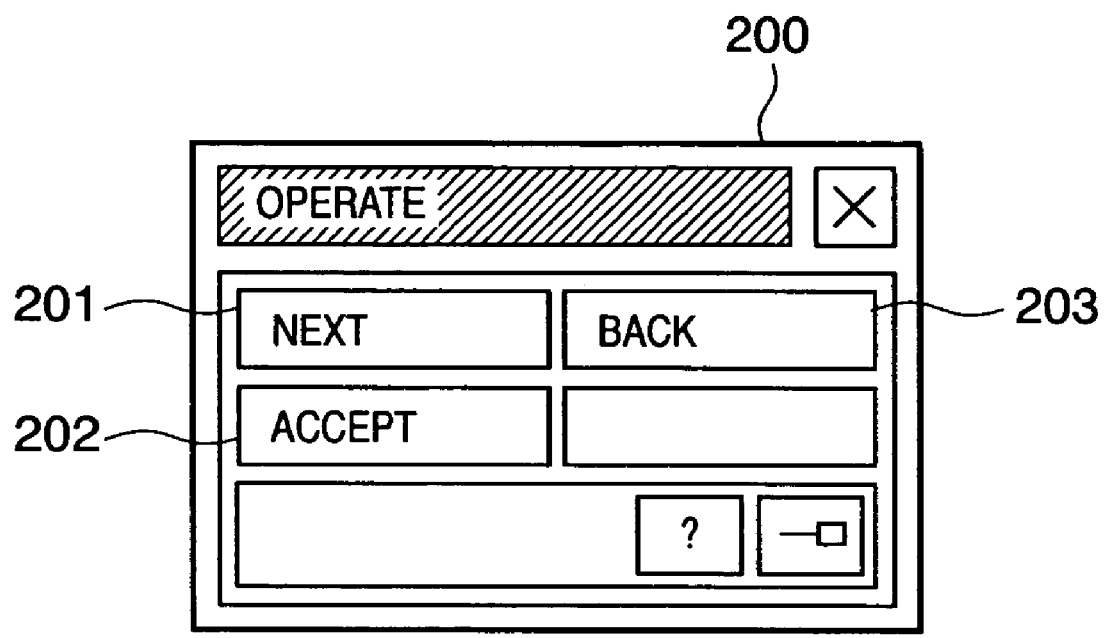
FIG. 23 is a diagram showing an operation window.

FIG. 13 is a diagram illustrating a selecting window 81. The selecting window 81 is provided with edge-line button 83 and a surface button 85. If an edge line has been clicked, the selecting window 81 is displayed and a designation becomes possible by clicking either button. In this case, although a maximum of three operations are required for a surface selection, the overall operation is still completed by only three clicks and this represents a simplification over the prior-art method. Further, in the above-described embodiment, a dimension is created with any surface of a 3D model serving as an element. However, this does not impose a limitation upon the present invention. The invention is similarly applicable using a selection window even in an arrangement in which a dimension is input with respect to an edge line or point.

It should be noted that the present invention is not limited to the arrangement of the embodiment described above and is applicable to any arrangement in which the functions set forth in the claims or the functions possessed by the embodiment can be achieved.

Further, the present invention may be applied to a system constituted by a plurality of devices or to an apparatus comprising a single device. Further, the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes per se read from the storage medium implement the novel functions of the embodiment and the storage medium storing the program codes constitutes the invention.

Examples of storage media that can be used for supplying the program are a ROM, a floppy (registered trademark) disk, a memory card such as a PCMCIA card or compact flash (registered trademark) card, a hard disk, a micro DAT, a magneto-optical disk, an optical disk such as a CD-R or CD-RW, and phase-change optical disk such as a DVD. The program codes may also be downloaded via a network.

Furthermore, besides the case where the aforesaid functions according to the embodiment are implemented by executing the program codes read by a computer, it goes without saying that the present invention covers a case where an operating system or the like running on the computer performs a part of or the entire actual process based upon the designation of program codes and implements the functions of the embodiment by such processing.

Furthermore, the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire actual process in accordance with the designation of program codes and implements the function of the embodiment by such processing.

In accordance with the surface selecting method of the invention, the operation for selecting a surface that is not being displayed on a screen is simplified. As a result, the operation for selecting the surfaces of a 3D model can be simplified, the burden on the operator can be alleviated and the efficiency of operation can be improved. Accordingly, a design operation using 3D-CAD can be made more efficient.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-253101 filed on Aug. 31, 2004, the entire contents of which are hereby incorporated by reference herein.

What is claimed is:

1. A surface selecting method in an information processing apparatus for selecting a prescribed surface of a 3D model displayed on a display unit of the information processing apparatus, comprising:

a display control step of controlling the display unit so as to display the 3D model;

a detection step of detecting an indication to an edge line formed by two adjoining surfaces of the 3D model displayed on the display unit;

a determination step of determining whether the indication is an indication to an edge line formed between a first surface and a second surface, wherein the first surface is not being displayed and the second surface is being displayed on the display unit; and a selection step of selecting the first surface, which is not being displayed on the display unit, if the indication is an indication to the edge line formed between the first and second surfaces.

2. The method according to claim 1, further comprising a display step of displaying the first surface, which is not being displayed on the display unit, on the display unit in an identifiable manner if the indication is an indication to the edge line formed between the first and second surfaces.

3. The method according to claim 1, further comprising a setting step of setting attribute information, which indicates a distance dimension, with respect to the first surface that has been selected.

4. An information processing apparatus for selecting a prescribed surface of a 3D model displayed on a display unit of the information processing apparatus, comprising:

display control means for controlling the display unit so as to display the 3D model;

detection means for detecting an indication to an edge line formed by two adjoining surfaces of the 3D model displayed on the display unit;

determination means for determining whether the indication is an indication to an edge line formed between a first surface and a second surface, wherein the first surface is not being displayed and the second surface is being displayed on the display unit; and selection means for selecting the first surface, which is not being displayed on the display unit, if the indication is an indication to the edge line formed between the first and second surfaces.

5. A computer-readable storage medium encoded with a computer program for causing a computer to execute a surface selecting method set forth in claim 1.

* * * * *